Oct. 25, 1955  J. H. YODER  2,721,646
OVERHEAD CONVEYOR

Filed March 20, 1953  3 Sheets-Sheet 2

INVENTOR.
John H. Yoder
BY
Attys.

Oct. 25, 1955
J. H. YODER
2,721,646
OVERHEAD CONVEYOR
Filed March 20, 1953
3 Sheets-Sheet 3
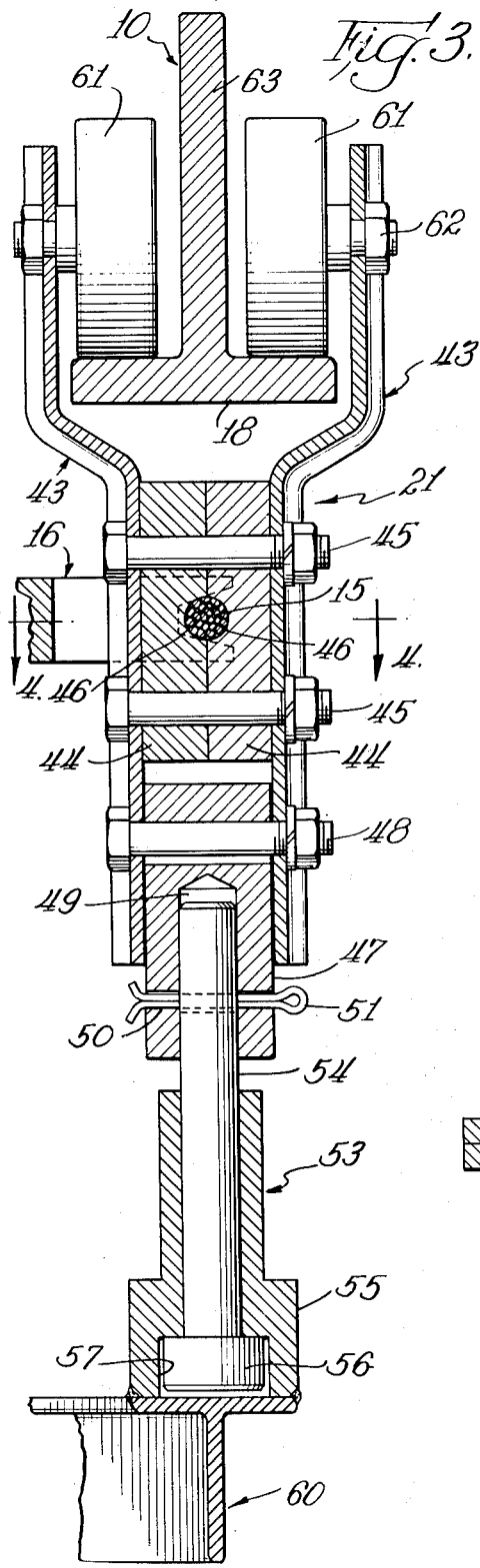
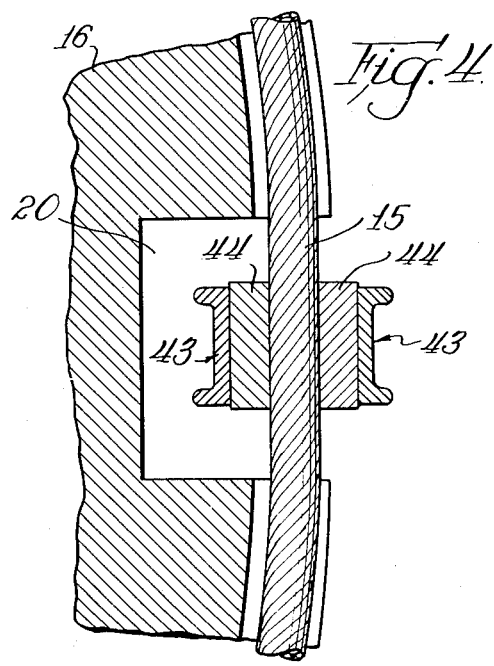
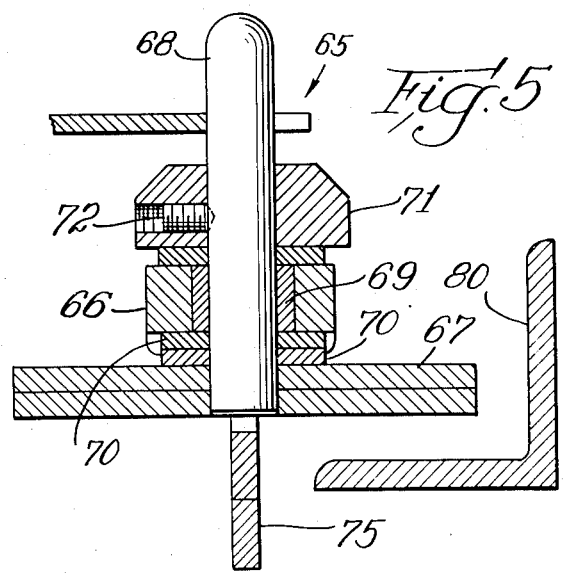
INVENTOR.
John H. Yoder United States Patent Office 2,721,646
Patented Oct. 25, 1955

2,721,646

OVERHEAD CONVEYOR

John H. Yoder, Waterford, Ind.

Application March 20, 1953, Serial No. 343,605

4 Claims. (Cl. 198—177)

My present invention relates generally to conveyors and more particularly to overhead conveyors of the continuous circuit or closed path variety.

Specifically the subject of my present invention pertains to a new and improved means for effecting the movement of articles of manufacture, particularly such articles as sheets of metal and the like, through turn portions of a continuous conveyor path while utilizing a minimum amount of space.

The need of an improved system of conveying articles of manufacture, particularly large sheets of metal and the like, along the circuitous tracks of overhead conveyors, such as a rail variety, has been long felt in various industries. For example, the painting and drying of large steel panels is carried out in many industries prior to their fabrication into useful articles of manufacture. According to one familiar procedure, such sheets of metal are sprayed or dipped to provide the same with a protective coating and then dried by conveying the same through suitable drying stations normally located in the circuit of a continuous overhead conveyor system. It will be understood and recognized by those familiar with the art, that such present day conveyor systems normally employ semi-circular turn portions of the track around which movable carrier means progress to effect a desired reversal in the direction of movement of articles carried thereby. Obviously, such a system entails the utilization of large areas of overhead space to complete the curvilinear turns with a resulting lack of compactness which is both expensive to the manufacturer and inefficient in its operation.

My present invention seeks to improve on presently known overhead conveyor systems by effecting therein changes in the system and instrumentalities utilized for making U-turns in the conveyor circuit. It will be recognized, especially where it is desirable to maintain work articles, such as large sheets of metal, in a non-deformed or planar condition throughout the conveying circuit that a means for avoiding bending of the sheet articles as they move around the turns in the conveyor path is most important. To this end the turn mechanism of my present invention employs a means for translating work articles, such as large sheets of metal and the like, laterally between adjacent parallel track sections of a continuous overhead conveyor system thereby to effect a change of direction in the movement of the articles.

The main object of my present invention is to provide a new and improved continuous conveyor system in which improved means are employed for effecting U-turns therein.

Another object of my present invention is to provide a new and improved mechanism for use in continuous overhead conveyors whereby compactness of arrangement and simplicity of operation in the transporting of articles, especially sheet materials, around turns in the conveyor path may be accomplished.

Still another object of my present invention is to provide a new and improved turning mechanism for use in overhead conveyors whereby the transportation of sheet material through U-turns, or that is, through substantially 180° of direction reversal may be accomplished in an easy and efficient manner.

A still further object of my present invention is to provide a new and improved means for effecting U-turns in a continuous overhead conveyor system whereby work materials, such as large sheets of metal, may be effectively transferred and reversed in their direction of travel by translating the articles bodily between parallel sections of the conveyor track without the necessity of bending the same or carrying the same around a curvilinear turn portion of the track.

The above and further objects, features and purposes of my present invention will be recognized and appreciated from the following detailed description and specification thereof and with reference to the accompanying drawings which set forth a preferred example of how the concepts of my invention may be utilized effectively.

In the drawings:

Figure 3 is an enlarged cross sectional view taken substantially along line 3—3 of Figure 1, showing in detail the structural features of the hanger assemblies preferably employed in a conveyor system according to my invention;

Figure 4 is an enlarged partial sectional view taken substantially along line 4—4 of Figure 3 and looking in the direction of the arrows therein; and Figure 5 is an enlarged detailed cross sectional view, with parts thereof shown in full elevation, taken substantially along line 5—5 of Figure 1 to illustrate features of the guide assembly used with my improved turn mechanism.

Figure 1:
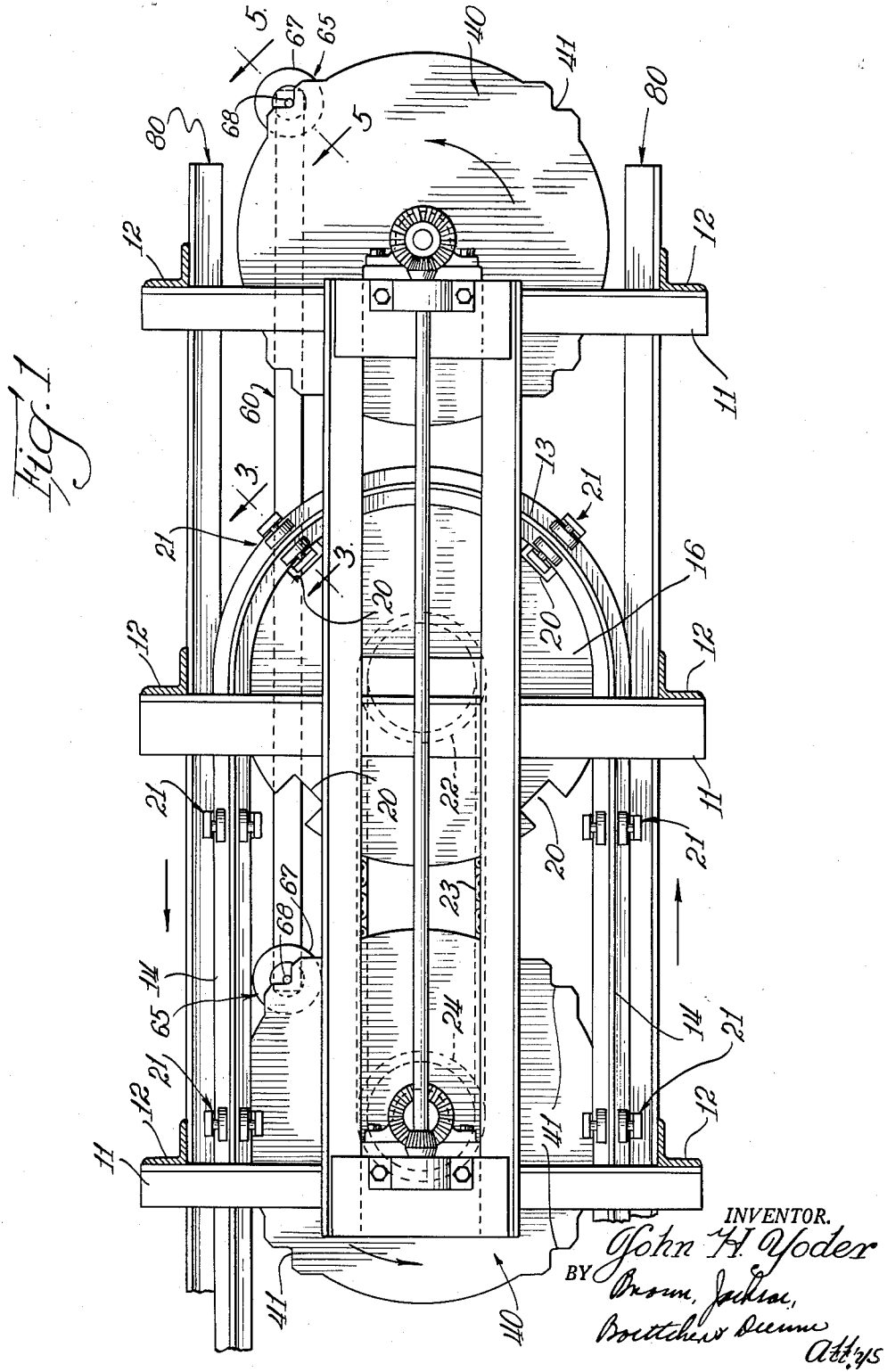
Figure 1 is a top plan view of a turn portion of an overhead conveyor system embodying the principles and features of my present invention whereby improved transfer of work articles between parallel sections of conveyor track may be accomplished.
Figure 2:
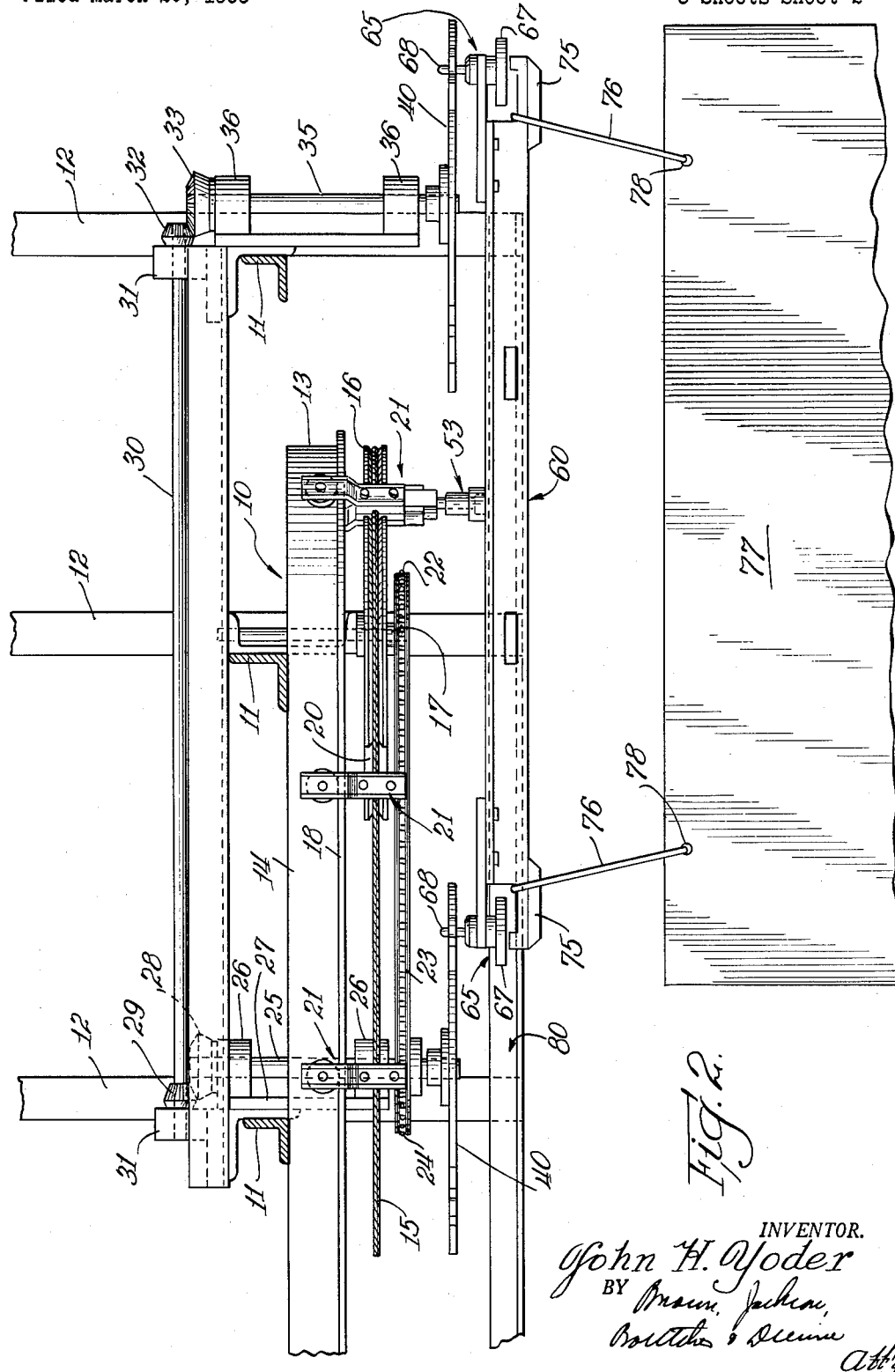
Figure 2 is a side elevational view of my new and improved turn portion of a conveyor system shown in Figure 1.

Turning now to the features of my present invention as illustrated by the preferred embodiment thereof shown in the drawings, it will be recognized from Figures 1 and 2, in particular, that the particular embodiment illustrated is directed generally to a conventional and familiar overhead cable driven conveyor system employing cable driven hangers upon which work articles are fastened for movement along a conveyor track located in the overhead space of a production plant or the like. In this regard, it will be understood, that the concepts, features and devices of my present invention are not necessarily restricted to use with such a cable conveyor but find like utility in other styles of conveyor systems as well, for example, in conveyors employing link chain or link belt drives, etc. For purposes of illustration, however, in Figure 2 is shown a T-shaped conveyor track or rail 10 which is suspended from the overhead framing of an industrial plant or building by any suitable means, such as the frame work of angle iron cross girders 11, and vertical structural members 12.

The improved turn mechanism which comprises the major contribution of my present invention to the art, is located adjacent a curved turn portion 13 interconnecting parallel spaced straight sections 14, 14 of the track 10. In this regard, it will be understood that a turn mechanism, as I have illustrated in Figures 1 and 2 of the drawings, is associated with each turn portion of the conveyor rail 10 and that the circuit of the conveyor rail may take numerous shapes such as a serpentine arrangement etc., according to the dictates and convenience of the user.

Turning now in greater detail to the features and elements of my improved turn mechanism, it will be appreciated that a drive cable member 15 is run over a sheave member or wheel 16 at each turn in the conveyor and that such cable is activated or placed into motion according to conventional power drive means. The sheave wheel 16 is mounted at the lower end of rotatably driven drive shaft 17 and disposed immediately adjacent and beneath a horizontal flange portion 18 of the conveyor rail and coaxially of turn portion 13 therein. From Figure 1 it will be recognized that the sheave wheel 16 is provided with spaced cutout portions 20, 20 along its periphery for clearing hanger assemblies 21 which are driven by cable 15 as will be described more fully hereinafter.

Also mounted on shaft 17 and immediately below the sheave wheel member 16 is a sprocket wheel 22 arranged to drive a continuous chain 23, also trained over a second sprocket wheel 24, mounted for rotation with a vertical stub shaft 25 spaced laterally from drive shaft 17. Stub shaft 25 is carried in bearing blocks 26, 26 supported on vertical plate member 27 secured to the framing which supports rail track 10. The upper end of stub shaft 25 carries a bevel drive gear 28 matingly engaging a pinion gear 29 which is mounted to one end of a horizontal shaft 30 carried between spaced bearing blocks 31, 31. The opposite end of transfer shaft 30 is similarly provided with a second pinion member 32 mating with a second bevel gear 33 which in turn is associated with a second vertical stub shaft 35 supported in bearing blocks 36, 36 similar to the mounting arrangement for stub shaft 25.

Attached to the lower end of each of the stub shafts 25 and 35 is one of two large horizontal index plates 40, 40. The diametrical dimensions of the index plates 40, 40 are approximately equivalent to the sheave wheel 16 and with the arrangement shown such index plates are disposed in coplanar alignment on opposite sides of the rotational axis of the sheave wheel 16. In the particular embodiment of index plates shown herewith, four spaced index notches 41 are provided in the periphery of each index wheel; the purpose of which notches will be more fully understood from later descriptive materials herein.

From the description of my turn mechanism so far, it will be understood that rotational driving of the two index wheels 40, their related stub shafts 25 and 35 and the sheave wheel 16 takes place in synchronism with the rotation of the sheave wheel drive shaft 17. This relation is important to the successful operation of the conveyor turn system herein of subject. It will be appreciated also that the two index indentations or notches 41, 41 of the two index wheels are disposed in like symmetrical array relative to one another, as particularly illustrated in Figure 1, so that the corresponding index stations on the two spaced or separated index wheels will move together in response to the rotary driving of the synchronous drive mechanism interconnecting the two index wheels. Likewise it will be appreciated that other means for driving the two index wheels in synchronous relation with respect to and corresponding to the rotary action of the sheave wheel 16 may be carried out; the particular system herein illustrated being typical of the concept involved for synchronously rotating the two index wheels 40, 40.

Turning now particularly to Figure 2 of the drawings, it will be recognized that the cable 15 is arranged to carry or be engaged by spaced hanger assemblies 21. Particularly, with reference to Figure 3 of the drawings, it will be understood that each of the hanger assemblies 21 comprises a pair of yoke arms 43, 43 separated by intermediate cable gripping block elements 44; the block elements and yoke arms being rigidly interjoined by means of bolt members 45. Also the cable gripping blocks 44 are provided with suitable matingly aligned recess portions 46 on adjacent faces thereof for receiving the cable member 15. Tightening of the bolt members 45 transversely of the block members 44 serves to rigidly connect the carrier assembly with the cable so that the same moves with the cable. In addition to the two cable gripping blocks 44, 44 the yoke arm members 43 also carry therebetween a swivel connector block 47 which is held in position at the lower ends of arms 43 by means of bolt means 48, substantially as illustrated in Figure 3. The swivel connector block is provided with an axial elongated opening 49 extending inwardly of its lower end and also a second opening 50 disposed transversely of the axial opening 49 and arranged to receive a cotter pin 51 or a like removable fastener. The swivel connector block 47 is adapted to engage a swivel assembly 53 comprising a pin member 54 and a swivel sleeve 55 arranged concentrically of pin 54.

In particular, the swivel pin 54 is disposed with an enlarged head end 56 thereof downwardly so that its shank end is ready for insertion in the axial opening 49 of the swivel connector block. Connection of pin 54 with block 47 is made by the passage of the cotter key connector 51 therethrough. The swivel sleeve 55 fits coaxially around the swivel pin and is provided with an enlarged cylindrical opening 57 at its lower end for receiving the enlarged head portion 56 of the swivel pin. The swivel sleeve once assembled with the swivel pin is then welded securely to a hanger bar 60 comprising an elongated section of channel iron having a cross section configured substantially as at T.

The upper end of each of the yoke arms 43 is provided with a roller member 61 disposed for rotation on a horizontal axis. The two rollers 61 thus associated with each hanger assembly are further arranged for coaxial rotation on separated stub shafts 62, each of which is connected respectively to its associated yoke arm 43 (see Figure 3). The roller wheels 61 of course are arranged to rollingly engage the horizontal platform portion 18 of the conveyor track 10.

With the arrangement as described immediately hereabove, it will be understood that driving of the conveyor cable member 15 serves to move the attached hanger assemblies 21 along the conveyor rail 10, with the rollers 61 of the hanger assemblies being disposed on opposite sides of a central rib section 63 of the conveyor track or rail. It further will be recognized that such an overhead rail conveyor is somewhat conventional in the art. Note, however, that each and every hanger assembly 21 is not provided with a swivel assembly 53, but that only periodically chosen swivel assemblies are utilized, according to the length of the hanger bars 60 being used, as will be best understood from a description of the hanger bars which now follows.

The hanger bars, as best illustrated in Figure 2 of the drawings, each comprise an elongated channel member connected at substantially its midpoint to a swivel assembly 53 so that only one hanger assembly 21 and one swivel assembly 53, respectively, are associated with each hanger bar 60. At the extreme ends of each hanger bar, a guide assembly 65 is provided, the features of which are best shown in Figure 5. Such guide assemblies each comprise a mounting plate member 66, rigidly connected near the associated end of the hanger bar and projecting longitudinally outwardly thereof, substantially as shown in Figure 2 of the drawings. The plates 66 support a guide wheel 67 carried on a vertical index pin 68. A sleeve bearing 69 supports pin 68 for rotation in plate 66 and spacer washers 70, 70 serve to space the roller 67 from its plate 66. A collar member 71 is arranged on pin 68 above plate 66 to lock the pin and its associated wheel 67 in assembly; a set screw 72 being used to lock the collar in place.

Also at each end of the hanger bar 60 is a projecting finger portion 75 extending beneath the guide assembly 65, substantially as shown in Figure 2 of the drawings. Such finger portions 75 are provided for the purpose of engaging hook elements 76 arranged to suspend sheet material 77.

In this regard it will be understood that the hanger bars 60 shown herein are of a length suitably selected according to the dimension between corresponding index notches 41 of the separated index wheels 40. If material 77 is suspended from bars 60 as illustrated then the material length is accordingly restricted. However sheets 77 of considerably greater length than bars 60 may be carried by the latter if auxiliary bars (not shown) of a length commensurate with such sheets are first connected along the upper edge thereof to give the sheets rigidity and the hooks 76 arranged between the hanger bars and such auxiliary bars, in a manner similar to that illustrated herein.

Disposed adjacent opposite sides of the turn mechanism described, and in position for engagement by the roller wheels 67 of the hanger bar assemblies, are two rub rails 80, 80 designed to maintain the hanger bars 60 and particularly the sheets 77 thereon in alignment during their progress along the conveyor. Such rub rails also prevent both unwanted swiveling of the hanger bars 60 as well as vertical tipping thereof about their associated hanger assemblies during the turning operation of my mechanism.

Use and operation

From the above description of the several elements and their arrangement in my new and improved turn mechanism, its utility and operating characteristics will be recognized by those familiar with the art. However, it may be stated briefly that my invention is arranged to convey large sheets of material, such as sheet steel or the like, through turn portions of an overhead conveyor system, preferably of the single rail style, as herein shown, in an improved manner. Selectively spaced hanger assemblies 21 are each arranged connectively with one swivel assembly 53 and a single hanger bar 60. This arrangement provides single point suspension for the hanger bars. The hook members 76 at opposite ends of the hanger bars are then engaged with a sheet of material 77 by means of carrier holes 78 formed therein or are connected to an auxiliary hanger bar, as described hereinabove, when the sheets 77 are considerably longer than bars 60.

In the normal industrial use of an overhead conveyor system as illustrated, the track element 10 is usually coursed in a serpentine fashion or other desired configuration to include a plurality of U-turns, such as the turn portion 13 illustrated in Figure 1 of the drawings. It will be recognized, especially from a study of Figures 1 and 2, that as each hanger assembly 21 carrying therewith a hanger bar 60 and suspended sheet 77 approaches the U-turn portion in the conveyor track, the hanger assembly 21, and particularly the portion having the cable gripping blocks 44, is received in an opening 20 of the sheave wheel, substantially as shown in Figure 1 and in enlarged detail in Figure 4 of the drawings. The hanger assembly 21 of course follows the path of the cable member 15 around the periphery of the sheave wheel in making the U-turn of the conveyor track. However, due to the single point suspension of the hanger bar provided by the swivel assembly 53 associated therewith, the bar is inclined to continue in the direction of rectilinear travel dictated by the straight portions 14 of the conveyor track as it approaches the turn portion 13. Such being the case, as the hanger assembly 21 commences on its curvilinear course around the periphery of the sheave wheel, the bar 60 engages an adjacent rub rail 80 through guide rollers 67 and the pin members 68 tangentially enter corresponding index openings 41 of the two index wheels 40. Since such index wheels are power driven and the index openings 41 thereof are constantly spaced to receive the index pins 68, rotational movement of the index wheel serves to guide the hanger bar 60 and the sheet 77 suspended therefrom bodily parallel to its own axis and between rub rails 80 until the same lies adjacent the opposite side of the sheave wheel 16; the bar 60 turning about its associated swivel pin 54 during this function. The rub rails 80 which are provided on opposite sides of the sheave wheels and the two index wheels, serve to maintain the suspended sheet and its associated hanger bar in a stable position parallel to track portions 14, both at the beginning and completion of the turn. In this respect, the guide wheels 67, associated with the ends of each hanger bar, also serve to engage, if necessary, the bottom flange of the rub rails 80 (see Figure 5) to prevent vertical tilting of the suspended sheet 77 (particularly the outer end thereof).

Thus it will be recognized that by means of my turn mechanism each hanger assembly 21 follows its normal curvilinear course as determined by the path of the drive cable 15, but the sheet materials suspended from the hanger bars 60 do not follow such a curvilinear course at the turns in the conveyor track. Instead bars 60 pivot around their hanger assemblies via the swivel connection therewith and thereby pass between the parallel straight run portions 14, 14 of the track 10 with a motion of translating parallelism.

The novel features and advancement which the mechanism of my invention spell over devices of this class heretofore known will be readily appreciated and understood especially with regard to its space saving features and the adaptability of the turn mechanism to transfer successfully across the turns sheet materials of various sizes and lengths. This latter feature arises since the radius of the track turn portions is independent of the size or length of material being carried through the turn under my system. In other words, the turns in the track can be sharp rather than sweeping as would be needed if the sheet materials followed the curve of the turn.

It will thus be recognized that while I have herein shown and described the features of my invention as related to a preferred and workable embodiment thereof, numerous changes, modifications and substitutions of equivalents may be resorted to without departing from the spirit and scope of my invention. Therefore, I do not wish to be limited to the specific embodiment herein illustrated and described except as may appear in the following appended claims.

I claim:

1. For use in a continuous overhead conveyor of the general class described, an improved means for effecting turns in the path of articles conveyed, comprising, a pair of parallel, spaced, overhead, linear track members, curvilinear turn portions of track interjoining the terminal ends of said linear track portions, a rotatably driven horizontal sheave wheel located between said track members and adjacent said turn portion thereof, a pair of coplanar horizontal index wheels mounted on opposite sides of said sheave wheel, one being located radially outward of said turn portion; cable means driven by said sheave wheel, pivotal hanger assembly means driven by said cable means along said track members and turn portions, hanger bar means, each point suspended from one of said hanger assemblies, for supporting therebeneath articles to be conveyed, and means for guiding simultaneously the ends of each of said hanger bar means into supported engagement with and at corresponding index positions on the peripheries of said two index wheels as said hanger assembly related thereto advances along the periphery of said sheave wheel and follows said track turn portions, such that each of said hanger bar means and articles conveyed traverse the axis of said sheave wheel and are translated parallel to and between said track members at said turn portions.

2. An improved turn mechanism for use with overhead rail conveyors having parallel spaced overhead linear rail portions interconnected at their ends by curved turn portions, comprising, plural hanger means attached at spaced intervals to an overhead cable means of said conveyor and movable in accordance with the coursing of said rail portions, said hanger means each being movable with said cable around the periphery of driving sheave wheel means disposed adjacent said turn portions, plural elongated hanger bar means each arranged to support elongated work articles, swivel connector means suspending each of said hanger bar means, substantially at its midpoint, from one of said hanger means, pin members projecting from the ends of said hanger bar means, a pair of coplanar spaced index wheels disposed on opposite sides of said sheave wheel means and intermediate parallel vertical planes as defined by said linear rail portions, said index wheels having correspondingly arranged index notches formed in their periphery and being mounted for rotation on spaced axes paralleling the rotational axis of said sheave wheel, and drive means located over said rail portions for synchronously rotating said index wheels and said sheave wheel whereby said pin members of said hanger bar means may each engage a corresponding index notch of one of said two index wheels for positively holding said bar horizontal and guiding the same in parallelism to its own longitudinal axis between said linear rail portions while the hanger assembly connectively associated therewith follows said cable along the curvilinear course of said turn portion.

3. A mechanism for effecting travel of elongated work articles between parallel spaced linear portions of an overhead conveyor track and at a curvilinear interjoining turn portion thereof, comprising in combination, a rotatably driven sheave wheel disposed radially inward of the turn portion, a pair of coplanar rotatable index wheels disposed adjacent, but on opposite sides of said sheave wheel, one in-between said linear track portions and one radially outward of said turn portion, said three named wheels having coplanar axes of rotation; synchronous drive means driven by said sheave wheel for rotating said index wheels synchronously with said sheave wheel, cable means following the course of said track and driven by said sheave wheel, hanger assemblies having rolling engagement with said track and dependingly suspended from said cable for movement therewith, elongated linear bar means arranged to suspend articles to be conveyed therebeneath, single swivel means suspending one of said bar means substantially at its midpoint from one of said hanger assemblies, and pin members at the opposite ends of said bar means arranged to engage corresponding index notches in the periphery of said index wheels whereby said bar is positively held against swiveling action on its related swivel means and is transferred parallel to its own longitudinal axis from one to the other of said linear track portions.

4. A turn mechanism for use in an overhead rail conveyor of the class described, comprising, a sheave wheel arranged adjacent a turn portion in said conveyor's rail for the purpose of driving a cable member adjacent said rail, a pair of spaced index wheels mounted on opposite sides of said sheave wheel and on spaced axes coplanar with the rotational axis of said sheave wheel, drive means interconnecting said sheave wheel and said two index wheels whereby the same are synchronously rotatable with said sheave wheel, hanger assembly means rollingly engaging said rail and connectively associated with said cable for movement with the latter and along said rail, elongated hanger bar means constructed and arranged to support work articles, single swivel connector means, substantially at the midpoint of said bar means, and detachably connecting said bar means with one of said hanger assemblies, projecting pin means at the ends of said bar means for engaging said index wheels, rub rail means disposed parallel to linear portions of said conveyor's rail which merge with ends of said turn portion therein, and roller means mounted on the ends of said bar means adjacent said pin means thereon for rollingly engaging said rub rail means and guiding said hanger bar means tangentially into contact with said index wheels, whereby said index wheels serve to guide said bar means substantially parallel to its own longitudinal axis across said conveyor's turn portion while said bar swivels about its connection with its associated hanger assembly and the latter follows the curvilinear course of said conveyor's turn portion.

References Cited in the file of this patent

UNITED STATES PATENTS

| 976,618 | Weilman | Nov. 22, 1910 |
| 2,334,511 | Seubert | Nov. 16, 1943 |
| 2,490,289 | Williams et al. | Dec. 6, 1949 |